(12) United States Patent
Ho et al.

(10) Patent No.: US 8,989,521 B1
(45) Date of Patent: Mar. 24, 2015

(54) DETERMINATION OF DANCE STEPS BASED ON MEDIA CONTENT

(75) Inventors: Casey Kwok Ching Ho, San Jose, CA (US); Pauline Seng, Mountain View, CA (US); Sharvil Nanavati, Dundas (CA)

(73) Assignee: Google Inc., Mountain View, CA (US)

( * ) Notice: Subject to any disclaimer, the term of this patent is extended or adjusted under 35 U.S.C. 154(b) by 787 days.

(21) Appl. No.: 13/303,320

(22) Filed: Nov. 23, 2011

(51) Int. Cl.
*G06K 9/60* (2006.01)
*G06K 9/00* (2006.01)
*G06F 3/00* (2006.01)

(52) U.S. Cl.
USPC ............... 382/305; 382/181; 348/61; 725/38

(58) Field of Classification Search
None
See application file for complete search history.

(56) References Cited

U.S. PATENT DOCUMENTS

| | | | |
|---|---|---|---|
| 4,712,103 A * | 12/1987 | Gotanda | 340/5.53 |
| 6,001,013 A * | 12/1999 | Ota | 463/7 |
| 6,353,170 B1 * | 3/2002 | Eyzaguirre et al. | 84/603 |
| 6,433,267 B2 | 8/2002 | Park | |
| 6,438,166 B2 * | 8/2002 | Kudou | 375/240 |
| 6,663,491 B2 * | 12/2003 | Watabe et al. | 463/36 |
| 6,758,756 B1 * | 7/2004 | Horigami et al. | 463/43 |
| 6,898,759 B1 * | 5/2005 | Terada et al. | 715/202 |
| 7,000,200 B1 * | 2/2006 | Martins | 715/863 |
| 7,164,076 B2 * | 1/2007 | McHale et al. | 84/616 |
| 7,217,878 B2 * | 5/2007 | Ludwig | 84/609 |
| 7,373,377 B2 * | 5/2008 | Altieri | 709/203 |
| 7,517,219 B2 * | 4/2009 | McDonald et al. | 434/250 |
| 7,528,315 B2 | 5/2009 | Goodwin | |
| 7,758,427 B2 * | 7/2010 | Egozy | 463/42 |
| 7,790,976 B2 * | 9/2010 | Takai et al. | 84/612 |
| 7,806,759 B2 * | 10/2010 | McHale et al. | 463/7 |
| 8,010,162 B2 * | 8/2011 | Kim et al. | 455/566 |
| 8,057,290 B2 * | 11/2011 | Vance et al. | 463/7 |
| 8,132,103 B1 * | 3/2012 | Chowdhury et al. | 715/723 |
| 8,145,594 B2 * | 3/2012 | Geisner et al. | 707/607 |
| 8,254,964 B2 * | 8/2012 | Linden | 455/456.3 |
| 8,416,185 B2 * | 4/2013 | Doi et al. | 345/156 |
| 8,444,464 B2 * | 5/2013 | Boch et al. | 463/7 |
| 8,562,403 B2 * | 10/2013 | Boch et al. | 463/7 |
| 8,591,329 B2 * | 11/2013 | Lau | 463/31 |
| 8,594,846 B2 * | 11/2013 | Nakadai et al. | 700/258 |
| 8,719,707 B2 * | 5/2014 | Chowdhury et al. | 715/723 |
| 8,761,437 B2 * | 6/2014 | Kirovski et al. | 382/103 |
| 2002/0117043 A1 * | 8/2002 | Powley | 84/483.2 |
| 2008/0258921 A1 | 10/2008 | Woo | |

(Continued)

FOREIGN PATENT DOCUMENTS

WO 2009035199 3/2009

*Primary Examiner* — Manav Seth
(74) *Attorney, Agent, or Firm* — McDonnell Boehnen Hulbert Berghoff LLP

(57) ABSTRACT

Methods and systems for determining dance steps based on music and/or other dancers. A wearable computing system may include a head mounted display (HMD). The wearable computing system may receive a media sample including an audio sample associated with a song and/or a video sample associated with one or more dancers performing a dance. The wearable computing system may communicate the media sample to a content analysis server that may include a content identification module. The content identification module may provide information associated with a content of the media sample, such as identification of the song and the dance, to the wearable computing system. The wearable computing system may determine dance steps corresponding to the content of the media sample and may generate a display of the dance steps on the HMD.

20 Claims, 7 Drawing Sheets

(56) References Cited

U.S. PATENT DOCUMENTS

| | | | |
|---|---|---|---|
| 2009/0267894 A1* | 10/2009 | Doi et al. | 345/156 |
| 2010/0271302 A1 | 10/2010 | Pering | |
| 2011/0306398 A1* | 12/2011 | Boch et al. | 463/7 |
| 2011/0309946 A1* | 12/2011 | Jonsson et al. | 340/686.6 |
| 2012/0058824 A1* | 3/2012 | Raptis et al. | 463/36 |
| 2014/0237038 A1* | 8/2014 | Newman et al. | 709/204 |

* cited by examiner

US 8,989,521 B1

DETERMINATION OF DANCE STEPS BASED ON MEDIA CONTENT

BACKGROUND

Multimedia rich environments have inspired development of media content recognition. Software applications can receive audio clips from a song and identify the song, for example. Content identification may use digital fingerprint-based technology to identify content using both audio and video image signals. Identification may be based on perceptual characteristics of the audio and video. Accuracy and speed of content identification have been improving with advances in computing power and recognition technologies.

Content identification can be useful in many fields. Content identification can help protect copyrights, for example. A user may attempt to upload a copyrighted audio or video content to a public website and when content of the copyrighted audio or video is identified the copyrighted audio or video may be prevented from being uploaded to the public website, for example. In another example, a user may be listening to a song or watching a video and may use content identification techniques to identify the song or the video and may obtain information about the song and the video that may have been unknown to the user.

SUMMARY

The present application discloses systems and methods to determine dance steps based on music and/or other dancers. In one aspect, a method is described. The method may comprise receiving, from a microphone coupled to a computing device, an audio sample rendered by a media rendering source and receiving, by a camera coupled to the computing device, a video sample of one or more dancers performing a dance gesture associated with a dance. The method may also comprise providing the audio sample and the video sample to a content identification module for determination of: (i) information associated with the audio sample and (ii) information associated with the dance based on recognition of the dance gesture in a content of the video sample. The method may further comprise receiving, from the content identification module, the information associated with the audio sample and the information associated with the dance. The method may also comprise determining one or more predetermined dance steps corresponding to the information associated with the audio sample and the information associated with the dance. The method may further comprise generating a display of the one or more predetermined dance steps.

In another aspect, a computer readable memory having stored thereon instructions executable by a computing device to cause the computing device to perform functions is described. The functions may comprise receiving, by a microphone coupled to the computing device, an audio sample rendered by a media rendering source and receiving, by a camera coupled to the computing device, a video sample of one or more dancers performing a dance gesture associated with a dance. The functions may also comprise providing the audio sample and the video sample to a content identification module for determination of: (i) information associated with the audio sample and (ii) information associated with the dance based on recognition of the dance gesture in a content of the video sample. The functions may further comprise receiving, from the content identification module, the information associated with the audio sample and the information associated with the dance. The functions may also comprise receiving one or more predetermined dance steps corresponding to the information associated with the audio sample and the information associated with the dance. The functions may further comprise generating a display of the one or more predetermined dance steps.

In still another aspect, a system is described. The system may comprise a wearable computer including a head-mounted display (HMD). The system may also comprise a camera coupled to the wearable computer and a microphone coupled to the wearable computer. The system may further comprise a processor in communication with the wearable computer, the camera, and the microphone. The processor may be configured to receive, from the microphone, an audio sample rendered by a media rendering source and receive, from the camera, a video sample of one or more dancers performing a dance gesture associated with a dance. The processor may also be configured to provide one or more of the audio sample and the video sample to a content identification module for determination of information associated with one or more of: (i) the audio sample and (ii) the dance based on recognition of the dance gesture in a content of the video sample. The processor may further be configured to receive, from the content identification module, the information associated with one or more of the audio sample and the dance. The processor may also be configured to determine one or more predetermined dance steps corresponding to the information associated with one or more of the audio sample and the dance. The processor may further be configured to generate a display of the one or more predetermined dance steps on the HMD.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
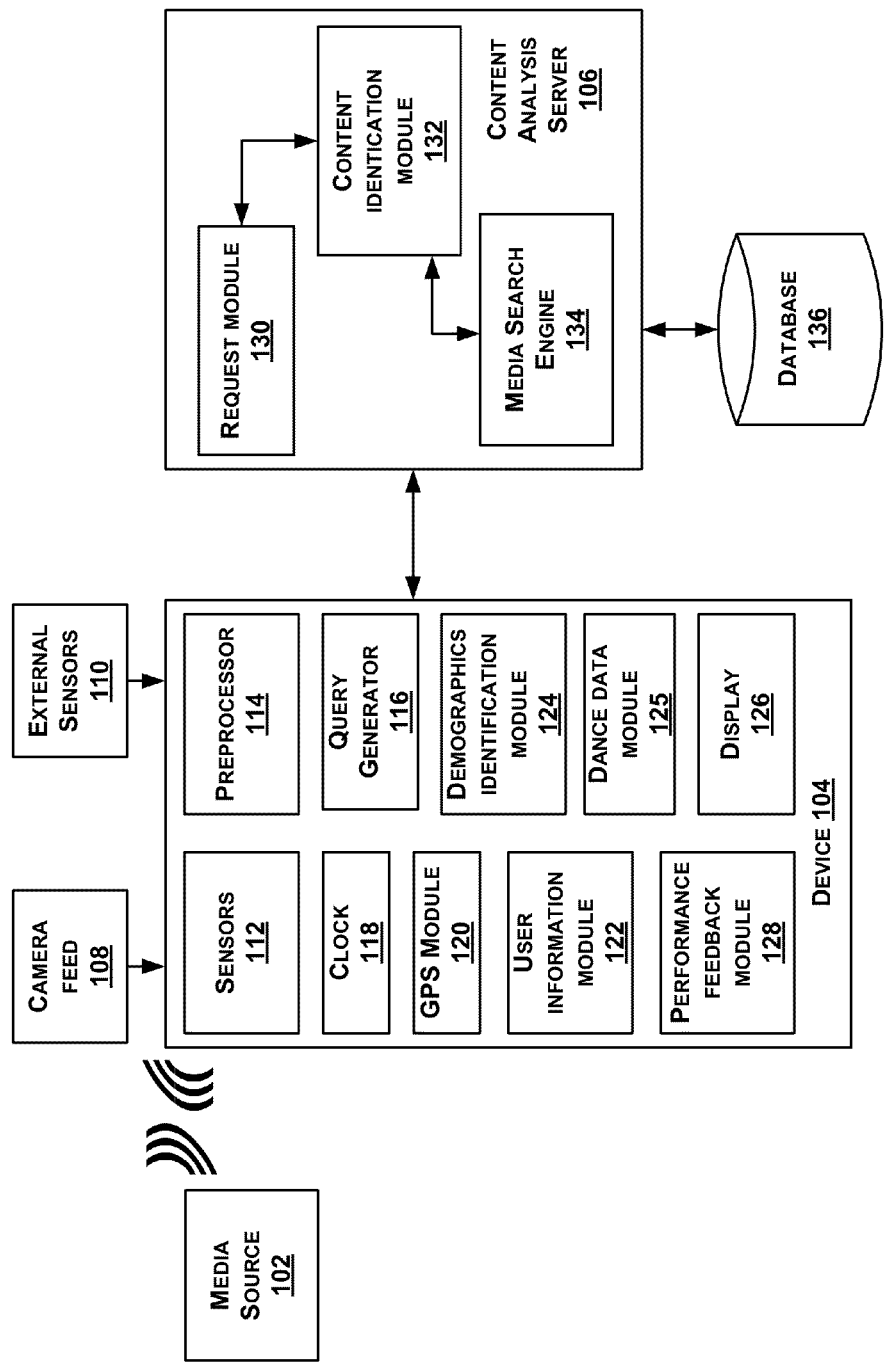
FIG. 1 is an example system for determining dance steps associated with a media sample, in accordance with an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

This disclosure may disclose, inter alia, systems and methods for determining dance steps based on music and/or other dancers. A wearable computing system may include a head mounted display (HMD). The wearable computing system may receive a media sample including an audio sample associated with a song and/or a video sample associated with one or more dancers performing a dance. The wearable computing system may communicate the media sample to a content analysis server that may include a content identification module. The content identification module may provide information associated with a content of the media sample, such as identification of the song and the dance, to the wearable computing system. The wearable computing system may determine dance steps corresponding to the content of the media sample and may generate a display of the dance steps on the HMD.

Other devices may be used in addition to or instead of the wearable computer system. For example, a mobile phone may be used. The device (e.g., the mobile phone or the wearable computing system) may include a microphone and/or a camera. A user of the device may be in an ambient environment where a song may be playing and one or more dancers may be performing dance gestures associated with a dance. The device may receive through the microphone an audio sample including the song. The device may also receive through the camera a video sample including the one or more dancers performing the dance gestures associated with the dance. The device may provide a media sample including the audio sample and/or the video sample to a content identification module. The content identification module may be coupled to the device or coupled to a server. The content identification module may identify a content of the media sample. For example, the content identification module may identify one or more of the song, a genre of the song, and may identify one or more of the dance and a genre of the dance. The content identification module may also identify more information associated with the content of the audio and video samples including a rhythm, a melody, and a tempo. The content identification module may communicate information associated with the content of the audio and video samples to the device. Based on the information associated with the content of the audio and video samples, the device may determine dance steps appropriate to the song and the dance.

In one example, the device may also receive information associated with the user of the device including an age and a gender of the user. The device may also receive or determine information associated with the ambient environment including a geographic location and a time. The device may further receive or determine information associated with a demographic of the one or more dancers including a number of dancers, an average age, and a gender. The device may then determine the dance steps based on the information associated with the user, the ambient environment, the demographic, and the content of the audio and/or video samples. To provide the dance steps to the user of the device, the device may generate a display of the dance steps. For example, the device may compile a video from multiple video segments and each segment may include a dancer performing at least one of the dance steps or may include an animation of a figure performing the dance steps.

The device may further receive information associated with a performance of the dance steps by the user. In one example, the device may include a wearable computing system with wearable sensors coupled to the wearable computing system. The wearable sensors may, for example, be distributed on a body of the user. The wearable sensors may include accelerometers, gyroscopes, magnetic rings, and magnetic anklets, for example. The wearable sensors may thus provide to the wearable computing system information associated with a motion of the user while performing the dance steps. The device may compare the performance of the dance steps by the user to the dance steps determined by the device. The device may further provide to the user an indication of a degree to which the performance of the dance steps by the user matches the dance steps and may provide instructions to the user to improve the performance of the dance steps. The instructions may include visual instructions or auditory instructions. For example, the wearable computing system may generate a display of an animation of a first pattern of dance steps associated with the dance steps determined by the device and an animation of a second pattern of dance steps associated with the performance of the dance steps by the user. The user may then be able to compare the dance steps determined by the device and the dance steps performed by the user and may attempt to match the dance steps determined by the device. In another example, the instructions may include voice instructions to the user on how to change the performance of the dance steps.

Referring now to the figures, FIG. 1 is an example system for determining dance steps associated with a media sample, in accordance with an example embodiment. The system includes a media source 102 that may provide or render a media sample to a device 104, which may be in communication with a content analysis server 106. The content analysis server 106 may also be in direct communication with the media source 102. The media source 102 is shown to communicate the media sample to the device 104 wirelessly as an example. However, depending on a form of the media sample, the media source 102 may provide the media sample using wireless or wired communication techniques. A camera feed 108 may also be input to the device 104. A camera providing the camera feed 108 may be external to the device 104 and may record a video of a user of the device 104. External sensors 110 may additionally provide information to the device 104. For example, the device 104 may include a wearable computing system, and the external sensors 110 may include wearable sensors coupled to the wearable computing system and/or a user of the wearable computing system. The wearable sensors may provide information associated with a motion of the user, for example. Components of the system illustrated in FIG. 1 may be configured to work in an interconnected fashion with each other and/or with other components coupled to respective systems. As an example, the device 104 and the content analysis server 106 may be coupled to one computing device.

The media sample may be stored on the media source 102 or received from external sources, such as an analog or digital broadcast. In one example, the media source 102 may be a media rendering source such as a radio station or a television content provider that broadcasts media streams (e.g., audio and/or video) and/or other information. The media source 102 may also include any type of device that may play audio media and/or may display video media in a recorded or live format. In another example, the media source 102 may include a live performance as a source of audio and/or a source of video. The audio sample may include a song, and the video sample may include one or more dancers performing a dance gesture associated with a dance.

The device 104 may include or may be coupled to sensors 112. The sensors 112 may, for example, include a microphone and a camera. The device 104 may be configured to receive portions of the media sample from the media source 102 as an audio sample through the microphone and a video sample through the camera, for example.

The device 104 may include a preprocessor 114. The preprocessor 114 may be configured to preprocess a media sample including the audio and video samples. For example, the preprocessor 114 may be configured to down-sample the media sample to reduce a size of the media sample before communicating the media sample to other modules coupled to the device 104 or to the content analysis server 106. The preprocessor 114 may also be configured to filter noise and distortion from the media sample, for example.

The pre-processor 114 may be configured to communicate a preprocessed media sample to a query generator 116. The query generator 116 may be configured to combine the preprocessed media along with other information received from other components coupled to the device 104 to generate a content identification query and communicate the content identification query to the content analysis server 106.

The device 104 may be configured to receive an indication of time from a clock 118 and may be configured to receive information associated with a location of the device 104, and thus a location of a user of the device 104, from a Global Positioning System (GPS) module 120.

The device 104 may be configured to receive or determine information associated with the user of the device. In one example, the user may input information to the device 104, and the information may be stored in a user information module 122. In another example, the user information module 122 may be configured to determine the information associated with the user of the device 104 using the sensors 112 and/or the external sensors 110 to determine the information associated with the user including one or more of an age and a gender of the user. For example, the user information module 122 may be configured to receive information associated with a camera facing the user and coupled to the device 104 and may be configured to determine the gender of the user through image recognition techniques.

The user of the device 104 may be in an environment including a live performance as a source of audio and/or a source of video, for example. The video sample may include dancers performing a dance. A demographics identification module 124 may be configured to receive information associated with or determine through the sensors 112 and/or the external sensors 110 demographics of the dancers including one or more of a number, a gender, and an average age of the dancers.

In one example, the query generator 116 may be configured to receive a preprocessed media sample from the preprocessor 114, and may be configured to receive information associated with the indication of time from the clock 118, the information associated with the location of the device 104 from the GPS module 120, the information associated with the user from the user information module 122, and the information associated with demographics of the dancers from the demographics identification module 124. The query generator 116 may be configured to generate a content identification query and may be configured to communicate the content identification query to the content analysis server 106. The content analysis server 106 may be configured to identify the song and dance and other information associated with a content of the content identification query and may determine dance steps associated with the content of the query.

In another example, the content identification query may include the preprocessed media sample but may not include information associated with the indication of time, the information associated with the location of the device 104, the information associated with the user, and the information associated with demographics of the dancers. The query generator 116 may be configured to communicate the content identification query to the content analysis server 106. The content analysis server 106 may be configured to identify the content of the preprocessed media sample including the song and the dance and communicate information associated with the content of the media sample to the device 104. To determine dance steps, the device 104 may be configured to determine predetermined dance steps stored in a dance data module 125 corresponding to any of the information associated with the content of the media sample received from the content analysis server 106, the information associated with the indication of time received from the clock 118, the information associated with the location of the device 104 received from the GPS module 120, the information associated with the user received from the user information module 122, and the information associated with demographics of the dancers received from the demographics identification module 124. The dance data module 125 may include a mapping of the predetermined dance steps to characteristics of content of media including one or more of a genre, a rhythm, a melody, and a tempo, for example. The dance data module 125 may also map the predetermined dance steps to one or more of the information associated with the user, the information associated with the indication of time, the information associated with the location of the device 104, and the information associated with demographics of dancers. The dance data module 125 is shown to be coupled to the device 104 as an example. In other examples, the dance data module may be coupled to the content analysis server 106, or may be a separate module in communication with either of the device 104 or the server 106.

The device 104 may also be configured to generate a display of the dance steps on a display 126 coupled to the device 104. As examples, the predetermined dance steps may be stored in several forms such as a video of each step performed by a dancer or an animation of a figure performing the predetermined dance steps.

The user of the device 104 may view the dance steps determined by the device 104 or the content analysis server 106. The external sensors 110, the sensors 112, or the camera feed 108 may be configured to provide information associated with a performance of the dance steps by the user. For example, a camera may record a video of the user performing the dance steps and provide the device 104 with the camera feed 108. The device 104 may include a wearable computing system and the external sensors 110 may include wearable sensors coupled to the wearable computing system and/or the user of the wearable computing system. The wearable sensors may also provide information associated with a motion of the user, for example.

Based on the information associated with the motion of the user, a performance feedback module 128 coupled to the device 104 may be configured to compare the performance of the dance steps by the user to the dance steps determined by the device 104 or the content analysis server 106. The performance feedback module 128 may be configured to provide the user with feedback on the performance of the dance steps. The performance feedback module 128 may, for example, be configured to provide an indication of a degree to which the performance of the dance steps may match the dance steps identified by the device 104. The indication may, for example, include a score indicative of the degree to which the performance of the dance steps may match the dance steps.

The performance feedback module 128 may further be configured to provide instructions or corrective dance steps to the user to change or improve the performance of the dance steps by the user. Feedback and instructions may include visual instructions. Feedback may also be auditory. The user may listen to instructions for performance improvements, for example. Feedback may include general information such as a percentage of dance steps performed correctly or may include specific feedback including specific steps such as "raise right leg higher and quicker".

The device 104 may be in communication with the content server 106 either directly or via a network. The content analysis server 106 may include a request module 130, a content identification module 132 in communication with the request module 130, and a media search engine 134 in communication with the content identification module 132.

The request module 130 may be configured to receive from the device 104 a content identification query generated by the query generator 116, and may be configured to send identification information associated with the content identification query to the device 104. The query may include a preprocessed media sample and may include other information associated with the user of the device, the indication of time, the location of the device 104, and the demographics of the dancers. In an example, the content analysis server 106 may be configured to receive at the request module 130 a media sample from the device 104 or the media source 102 (either over a wired or wireless connection).

The content identification module 132 may be configured to identify a content of the received media sample. The content identification module 132 may be configured to identify a musical content of an audio sample included in the media sample, and provide the device 104 with information about the music content, including a track name, artist, album, genre, etc., for example. The content identification module 132 may also be configured to identify a dance content of a video sample included in the media sample, and provide the device 104 with information associated with the dance content, including a dance name and a dance genre, for example.

The content identification module 132 may be in communication with a media search engine 134. The media search engine 134 may include or have access to a database 136 that may index reference media, for example, to compare the received media sample with stored information so as to identify the content of the media sample. Once the content of the music and/or dance included in the media sample may have been identified, content identities or other information may be sent back to the device 104.

Alternatively, the device 104 may be configured to capture the media sample from the media source 102, and perform initial processing on the media sample in the preprocessor 114 so as to determine a fingerprint, i.e. a characteristic, of the media sample. The device 104 may then send the fingerprint information to the content identification module 132 coupled to the content analysis server 106, which may identify information associated with the media sample based on the fingerprint. In this manner, more computation or identification processing can be performed at the device 104, rather than at the content identification module 132, for example.

The database 136 may include many media recordings and each recording may be identified by a unique identifier (e.g., a fingerprint). The database 136 may not necessarily store audio or video files for each recording, since the fingerprint can be used to retrieve audio and/or video files from elsewhere. However, the database 136 may store the audio or video files in some examples. A database index may be large, containing indices for possibly billions of files, for example. New recordings can be added incrementally to the database index. The database 136 may also include information associated with each stored audio, video, or media file, or for each stored media index. For example, information associated with each file that indicates information about the file, such as an artist name, a length of a song, genre of the song, dance type, or any other identifying or related information to the file may be stored with each file.

Once the content of the media sample may have been identified, the content analysis server 106 or the device 104 may be configured to determine dance steps corresponding to the content of the media sample. Identified content of the media sample and the dance steps determined for the content of the media may be stored on the device 104 for later use if similar media content is received and for future reference of the user of the device 104.

Various media sample identification techniques are known in the art for performing computational content identifications of media samples and features of media samples using a database of media tracks. Identifying features of a media recording may begin by receiving the media sample and sampling the media recording at a plurality of sampling points to produce a plurality of signal values. A statistical moment of the signal can be calculated using any known formula. The calculated statistical moment may then be compared to a plurality of stored signal identifications and the media sample may be recognized as similar to one of the stored signal identifications. The calculated statistical moment can be used to determine a feature vector that may be quantized, and a weighted sum of the quantized feature vector may be used to access a memory or database that stores the signal identifications.

In another example, generally, media content can be identified by identifying or computing characteristics or fingerprints of a media sample and comparing the fingerprints to previously identified fingerprints. Particular locations within the media sample at which fingerprints may be computed depend on reproducible points in the media sample. Such reproducibly computable locations are referred to as "landmarks." A location within the media sample of the landmarks can be determined by the media sample itself, i.e., is dependent upon sample qualities and is reproducible. That is, same or similar landmarks may be computed for a given signal each time identification is repeated. A landmarking process may mark about 5 to about 10 landmarks per second of sound recording or video recording; however, landmarking density depends on an amount of activity within a media recording. One landmarking technique, known as Power Norm, includes calculating an instantaneous power at many time points in the media sample and selecting local maxima. Other methods for calculating landmarks may also be used.

Once the landmarks have been computed, a fingerprint may be computed at or near each landmark time point in the media sample. A nearness of a feature to a landmark may be defined by the fingerprinting method used. In some cases, a feature may be considered near a landmark if the feature corresponds to the landmark and not to a previous or subsequent landmark. In other cases, features correspond to multiple adjacent landmarks. The fingerprint may generally include a value or set of values that may summarize a set of features in the media sample at or near the time point. In one example, each fingerprint may include a single numerical value that may be a hashed function of multiple features. Other examples of fingerprints include spectral slice fingerprints, multi-slice fingerprints, cepstral coefficients, and frequency components of spectrogram peaks.

In one example, identifying a dance in a video sample may include comparing scenes of dancers performing the dance to fragments of dance videos recorded and stored in a database. A large size database may store videos of all dances and dance patterns. In another example, dance identification may include determining a fingerprint of the video sample including the dancers performing the dance and comparing the fingerprint to a database of fingerprints associated with relevant fragments of videos including dances and dance patterns.

Identification of a dance included in a video sample may include determining fingerprints based on semantical features and/or non-semantical included in the video sample. Fingerprints based on semantical features may be determined from high level features such as scene boundaries and color-histograms, for example. Fingerprints based on non-semantical features may be determined from general perceptual invariants that may not necessarily have a semantical interpretation, such as luminance.

Those skilled in the art will understand that a variety of different audio and video identification techniques could be used individually or in combination with other methods in order to identify music and dance content of a media sample.

The content identification module 132 may be configured to receive the media sample and may be configured to compute fingerprints of the media sample. The content identification module 132 may be configured to compute the fingerprints by communicating with additional recognition engines coupled to or separate from the content analysis server 106. To identify the content of the media sample, the content identification module 132 may be configured to communicate with the media search engine 134, which may be configured to access the database 136 to match the fingerprints of the media sample with fingerprints of known audio and video tracks. The media search engine 134 may be configured to generate correspondences between equivalent fingerprints and files in the database 136 to locate a file that has the largest number of linearly related correspondences, or whose relative locations of characteristic fingerprints most closely match relative locations of the fingerprints associated with the media sample.

The content identification module 132 may be coupled to the device 104 or may be coupled to a server such as the content analysis server 106 connected to the device 104 over a network, as shown in FIG. 1.

The camera feed 108 may be received by the device 104 from a camera recording a video of the user of the device 104. For example the camera may provide a video of the user of the device 104 performing the dance steps determined by the device 104. The performance feedback module 128 may compare a performance of the dance steps by the user in the video to the dance steps determined by the device 104 and provide feedback to the user to improve the performance of the dance steps.

The external sensors 110 may include wearable sensors for detecting movement of the user while the user may be performing the dance steps. The wearable sensors may include, for example, magnetic rings, belts, or anklets. Magnetic field from such sensors may be detected by the device 104 to determine information associated with a motion of the user. The external sensors 110 may include accelerometers and gyroscopes coupled to the device 104 or the user. The device 104 may be configured to receive information associated with the external sensors 110 and may be configured to accordingly evaluate the performance of the dance steps by the user.

Devices of different types may function as the device 104. For example, a mobile phone with a microphone and a camera may function as the device 104. A wearable computing system may also function as the device 104. The wearable computing system may be configured as, for example, eyeglasses, goggles, a helmet, a hat, a visor, a headband, or in some other form that can be supported on or from a head of a wearer or a user.

Figure 2A:
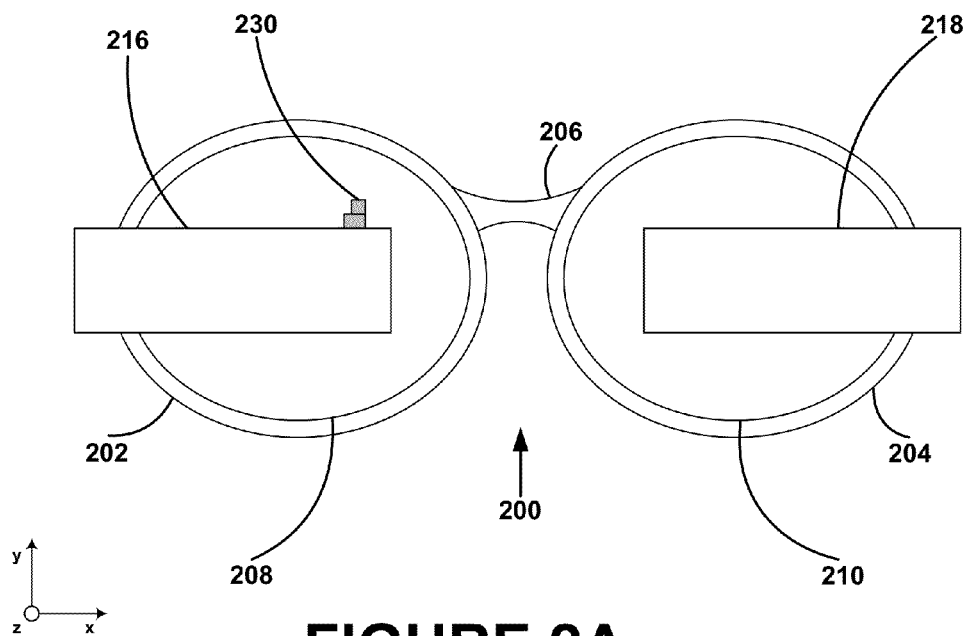
FIG. 2A illustrates a front view of an example wearable computing system including a head-mounted display (HMD) in an example eyeglasses embodiment.
Figure 2B:
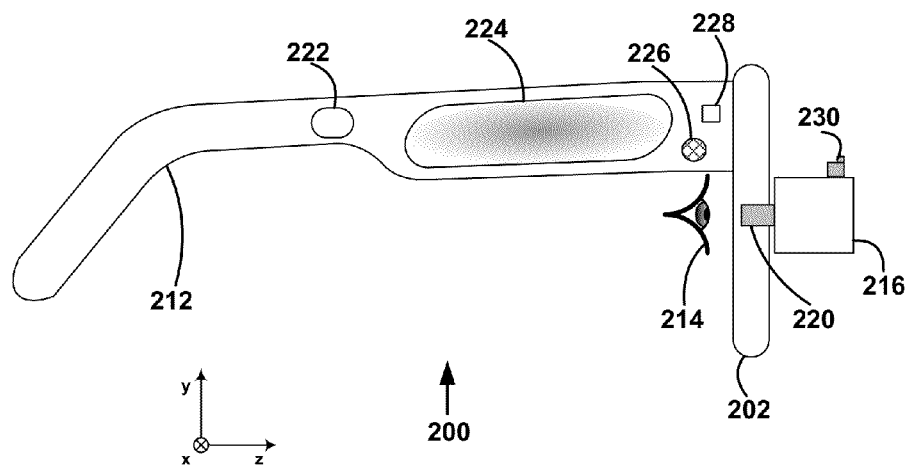
FIG. 2B illustrates a side view of the HMD in the example eyeglasses embodiment.

FIG. 2A illustrates a front view of an example wearable computing system including a head-mounted display (HMD) 200 in an example eyeglasses embodiment. FIG. 2B presents a side view of the HMD 200 in FIG. 2A. FIGS. 2A and 2B will be described together. Although this example embodiment is provided in an eyeglasses format, it will be understood that wearable systems and HMDs may take other forms, such as hats, goggles, masks, headbands and helmets. The HMD 200 may include lens frames 202 and 204, a center frame support 206, lens elements 208 and 210, and extending side-arm 212 that may be affixed to lens frame 202. There may be another extending side arm affixed to the lens frame 204 but is not shown. The center frame support 206 and side-arm 212 may be configured to secure the HMD 200 to a head of a wearer via a nose and an ear of the wearer. Each of the frame elements 202, 204, and 206 and the extending side-arm 212 may be formed of a solid structure of plastic or metal, or may be formed of a hollow structure of similar material so as to allow wiring and component interconnects to be internally routed through the HMD 200. Lens elements 208 and 210 may be at least partially transparent so as to allow the wearer to look through lens elements. In particular, a right eye 214 of the wearer may look through right lens 210. Optical systems 216 and 218 may be positioned in front of lenses 208 and 210, respectively. The optical systems 216 and 218 may be attached to the HMD 200 using support mounts such as 220 shown for the right optical system 216. Furthermore, the optical systems 216 and 218 may be integrated partially or completely into lens elements 208 and 210, respectively.

Although FIG. 2A illustrates an optical system for each eye, the HMD 200 may include an optical system for only one eye (e.g., right eye 214). The wearer of the HMD 200 may simultaneously observe from optical systems 216 and 218 a real-world image with an overlaid displayed image. The HMD 200 may include various elements such as a processor 222, a touchpad 224, a microphone 226, and a button 228. The processor 222 may use data from, among other sources, various sensors and cameras to determine a displayed image that may be displayed to the wearer. The HMD 200 may also include a front-facing camera 230 that may be integrated into the optical systems 216. Location of the front-facing camera 230 is for illustration only. The front-facing camera 230 may be positioned in different locations and may be separate or attached to the HMD 200. More than one front-facing camera may be used in some examples. Those skilled in the art would understand that other user input devices, user output devices, wireless communication devices, sensors, and cameras may be reasonably included in such a wearable computing system.

The HMD 200 may enable a user to observe surroundings of the user and also view a displayed image on a display of the optical systems 216 and 218. The user of the HMD 200 may be in an environment including a live performance as a source of audio and/or a source of video, for example. The life performance may include one or more persons dancing while a song may be playing. The user of the HMD 200 may not be an experienced dancer or may not know dance steps associated with the song being played or a dance being performed by the dancers.

Figure 3:
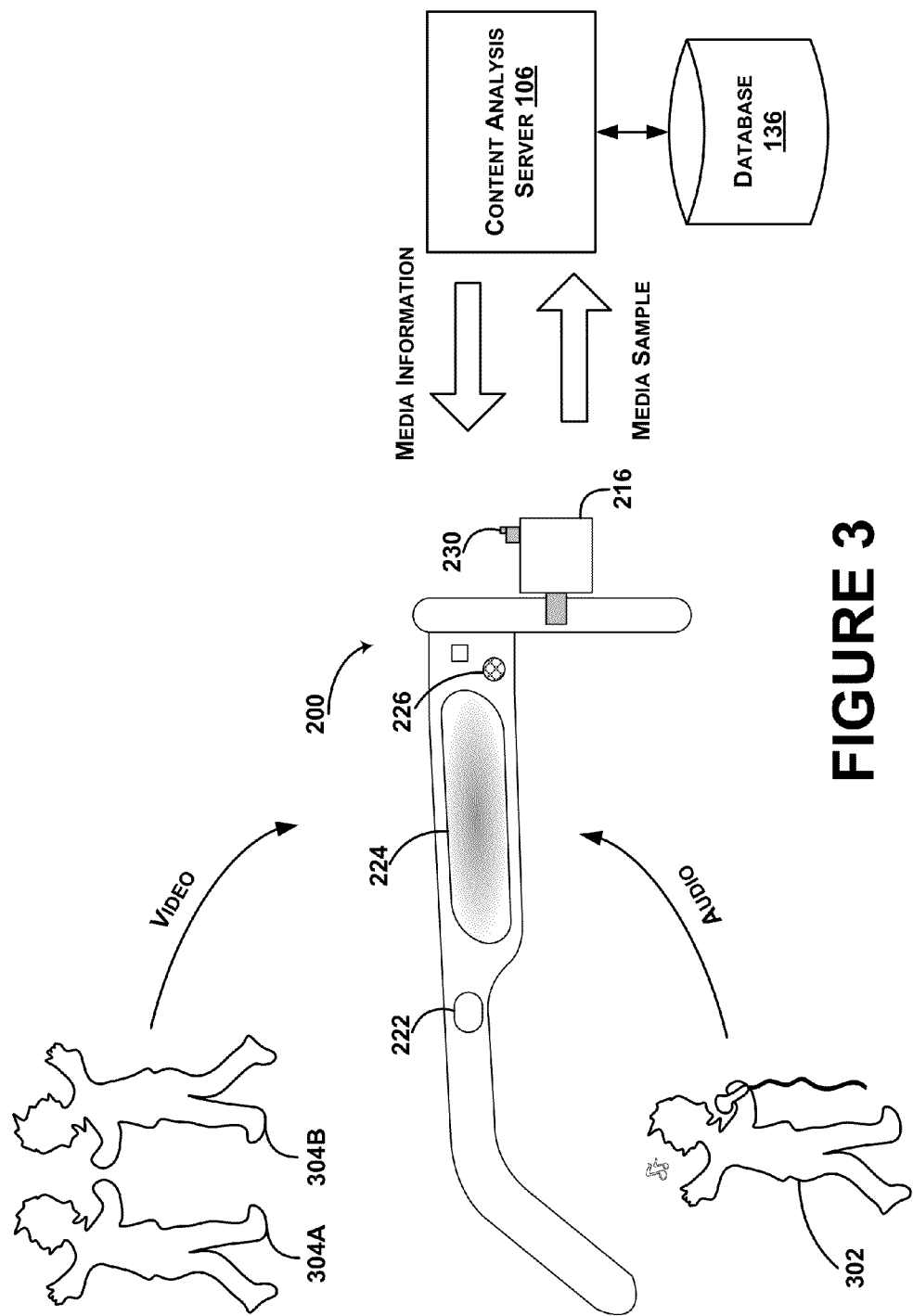
FIG. 3 is an example system, including the HMD, for determining dance steps associated with a media sample, in accordance with an example embodiment.

FIG. 3 is an example system, including the HMD 200, for determining dance steps associated with a media sample, in accordance with an example embodiment. A user may be wearing the HMD 200. The HMD 200 may be configured to use the microphone 226 to capture an audio sample of a song performed by a singer 302, and may be configured to use the front-facing camera 230 to capture a video sample of dancers 304A-B performing a dance. In other examples, the song may be played on any media player. Also, the dance may be performed on a television or other media players, for example.

The processor 222 coupled to the HMD 200 may be configured to receive the audio and video and may be configured to preprocess the audio and video to down-sample and filter noise from the audio and video samples, for example. The processor 222 may be configured to send a media sample (including the audio and video samples) through a network to the content analysis server 106, which may have access to the database 136 as described in FIG. 1.

The content analysis server 106 may be configured to identify a content of the media sample and determine information associated with the media sample. For example, the content analysis server 106 may be configured to determine or identify one or more of the song, a genre of the song, the dance, and a genre of the dance. The content analysis server 106 may be configured to communicate identified information associated with the media sample to the HMD 200 through the network. The HMD 200 may be configured to determine dance steps corresponding to the identified information associated with the media sample. The HMD 200 may be configured to generate a display of the dance steps on a display coupled to the optical system 216. The user may accordingly be able to view the dance steps and may attempt to perform the dance steps. In other examples, the content analysis server 106 may determine the dance steps and send the dance steps to the HMD 200. In another example, the HMD 200 may include a content analysis module to identify the content of the media sampled without communication with the content analysis server 106. The HMD 200 may be configured to store identification information for future use.

In some examples, the content analysis server 106 may be unable to determine the song and the dance but may be able to identify other relevant information, such as the genre of the song and the genre of the dance. Identifying the genre of the song and the genre of the dance may be sufficient for the HMD 200 to determine the dance steps.

In some examples, only the audio sample including the song or only the video sample including the dancers 304A-B may be available. In these examples, the content analysis server 106 may be configured to identify information associated with one of the song or the dance. The HMD 200 may be configured to determine the dance steps associated with only the information associated with the song or only the information associated with the dance.

In an example, in addition to or as an alternative to the HMD 200 capturing the audio and video samples from a media source and identifying the content of the audio and video samples through the content analysis server 106, the user may input information associated with the song and information associated with the dance steps using the touchpad 224 coupled to the HMD 200. The HMD 200 may be configured to determine the dance steps associated with the input information.

More than one user may each be wearing an HMD. A first user wearing a first HMD may have received dance steps associated with a given media sample and may start performing the dance steps. A second user wearing a second HMD may be watching the first user. The second HMD may include a front-facing camera facing the first user while the first user may be performing the dance steps. The first and second HMDs may be in communication with each other and the second HMD may be configured to send a camera feed of the first user performing the dance steps from the front-facing camera coupled to the second HMD. The first HMD may be configured to use the camera feed to evaluate a performance of the dance steps by the first user and may be configured to provide feedback and corrective instructions to the first user.

Figure 4:
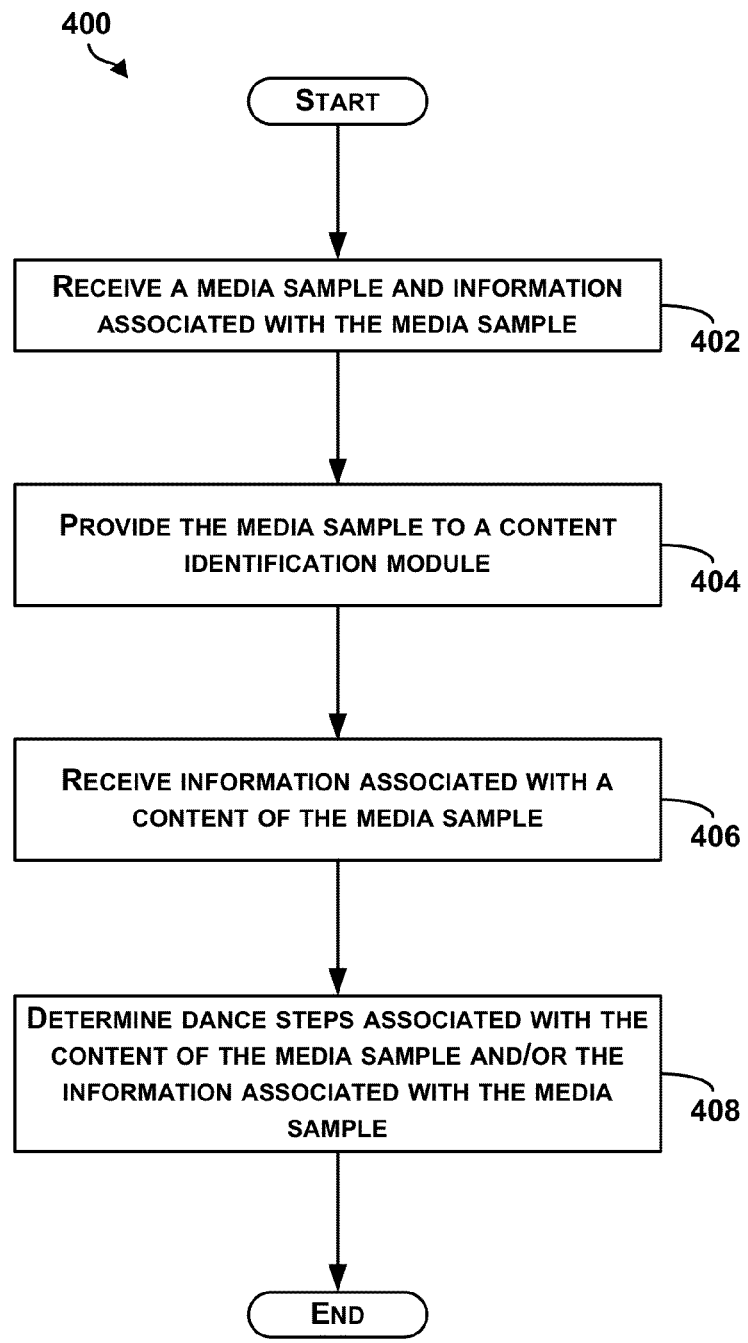
FIG. 4 is a flow chart of an example method to determine dance steps based on a media sample.

To determine dance steps associated with a media sample, the systems described in FIGS. 1 and 3 may follow a method 400 as described in FIG. 4, which is a flow chart of an example method to determine dance steps based on a media sample, in accordance with at least some embodiments of the present disclosure.

Method 400 may include one or more operations, functions, or actions as illustrated by one or more of blocks 402, 404, 406, and 408. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 400 and other processes and methods disclosed herein, each block in FIG. 4 may represent circuitry that is wired to perform the specific logical functions in the process.

A user of a device may be in an ambient environment including a source of audio and/or a source of video, for example. The environment may include a live performance including dancers performing a dance while a song may be playing. There may be other sources of audio and video such as any media player. The user of the device may not be an experienced dancer or may not know dance steps associated with the song being played or the dance being performed by the dancers.

At block 402, the method 400 includes receive a media sample and information associated with the media sample. A device may include a microphone and a camera or other means to capture or receive an audio sample and a video sample from the ambient environment, respectively. The audio sample may include the song and the video sample may include images of the dancers performing one or more dance gestures associated with the dance. The device may be configured to receive the audio sample, the video sample, or both. Thus, the media sample may comprise both the audio and video samples, or may comprise only one of the audio and video samples. The device may also be configured to determine through sensors or receive from the user or from a server information associated with the media sample such as: information associated with a demographic of the dancers (e.g., a gender and an average age of the dancers), information associated with an indication of time, and information associated with a location of the device, and thus a location of the user of the device from a GPS module, and information associated with the user of the device (e.g., age and gender), for example.

At block 404, the method 400 includes provide the media sample to a content identification module. The device may be configured to provide the media sample to a content identification module for identification of content of the media sample. The device may also be configured to provide to the content identification module the information associated with the media sample. In one example, the device may include the content identification module. In another example, the content identification module may be coupled to a server in wired or wireless communication with the device. The content identification module may be configured to apply audio and/or video recognition techniques to identify the content of the media sample. For example, the device or the content identification module may be configured to determine fingerprints associated with the content of the media sample. The content identification module may be configured to compare the fingerprints to fingerprints stored on a database. The database may be configured to store fingerprints associated with billions of songs and dances. The content identification module may be configured to match the fingerprints to fingerprints stored on the database and may be configured to accordingly identify the content of the media sample. The content identification module may be configured to identify the song and/or a genre of the song. The content identification module may also be configured to identify the dance and/or a genre of the dance.

At block 406, the method 400 includes receive information associated with a content of the media sample. The device may be configured to receive the information associated with the content of the media sample identified by the content identification module. The device may receive the information through network communication with the content identification module, for example. In another example, as an alternative to or in addition to the content identification module attempting to identify the contents of the media sample, the user may input the information associated with the media sample to the device. A touchpad or a keyboard may be coupled to the device, and the user may input a name of the song or the genre of the song and a name of the dance or the genre of the dance to the device through the touchpad or the keyboard. In still another example, the device may be configured to determine the location (e.g., a dance club) of the device and access, through a network (e.g., the internet), information associated with songs played and dances performed at the location. Still further, the device may be configured to perform computations to determine information associated with a content of the media sample.

At block 408, the method 400 includes determine dance steps associated with the content of the media sample and/or the information associated with the media sample. Based on the information associated with the content of the media sample, the device may be configured to determine dance steps corresponding to or appropriate to the media sample. In one example, the device may be configured to determine the dance steps based on the information associated with the media sample (e.g., user information, dancers demographics, geographic location, and time) in addition to the information associated with the content of the media sample (e.g., identified song and/or dance).

In an example, the user may attempt to perform the dance steps determined by the device along with the dancers performing the dance. The user may not be able to perform the dance steps perfectly. The user may receive feedback from the device associated with an indication of a degree to which a performance of the dance steps by the user may match the dance step and possibly how to improve the performance of the dance steps by the user.

Figure 5:
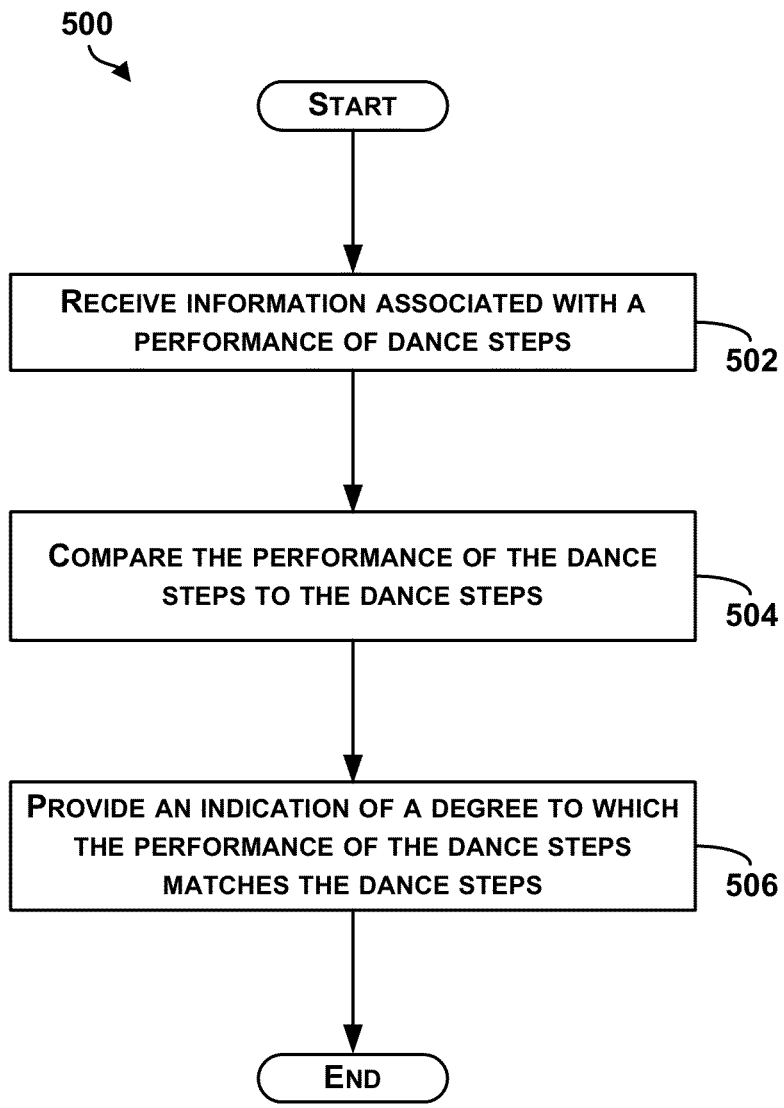
FIG. 5 is a flow chart of an example method to provide feedback to a user performing the dance steps.

FIG. 5 is a flow chart of an example method 500 to provide feedback to a user performing the dance steps. A device may have provided dance steps associated with a content of a media sample to the user as described in method 400 depicted in FIG. 4.

At block 502, the method 500 includes receive information associated with a performance of dance steps. The device may be configured to receive information associated with the performance of the dance steps by the user. For example, the device may include a mobile phone with gyroscopes and accelerometers coupled to the mobile phone. The device may be configured to receive information associated with or output from the gyroscopes and accelerometers and may be configured to track and evaluate the performance of the dance steps by the user. In another example, wearable sensors may be worn by the user for detecting movement of the user while the user may be performing the dance steps. The wearable sensors may include, for example, magnetic rings, belts, or anklets. Magnetic field from such sensors may be detected by the device to determine information associated with the motion of the user.

At block 504, the method 500 includes compare the performance of the dance steps to the dance steps (e.g., predetermined dance steps). For example, from the information associated with the performance of the dance steps, a processor coupled to the device may be configured to compare the performance of the dance steps to the dance steps provided to the user. The processor may, for instance, determine that the user may be performing a certain percentage of the dance steps correctly.

At block 506, the method 500 includes provide an indication of a degree to which the performance of the dance steps matches the dance steps. Based on the comparison performed at step 504, the device may provide performance feedback to the user. For example, the device may provide the user with a score indicative of the degree to which the performance of the dance steps by the user may match the dance steps. The score may be based on a percentage of correct dance steps performed, for instance.

In another example, the device or the processor coupled to the device may be configured to generate a display of a first dancing pattern or figure that may represent the performance of the dance steps by the user. The processor may also generate a display of a second dancing pattern or figure that may represent the dance steps provided to the user. The first and second dancing patterns may, for example, be animated figures that overlay each other on the display or may be displayed next to each other. The dancing patterns may provide the user with visual means of comparing the performance of the dance steps by the user to the dances steps provided to the user and how the dance steps may correctly be performed. The device may further be configured to display visual instructions or provide auditory instructions to the user including steps to improve the performance of the dance steps by the user and increase the degree to which the performance of the dance steps may match the dance steps.

Figure 6:
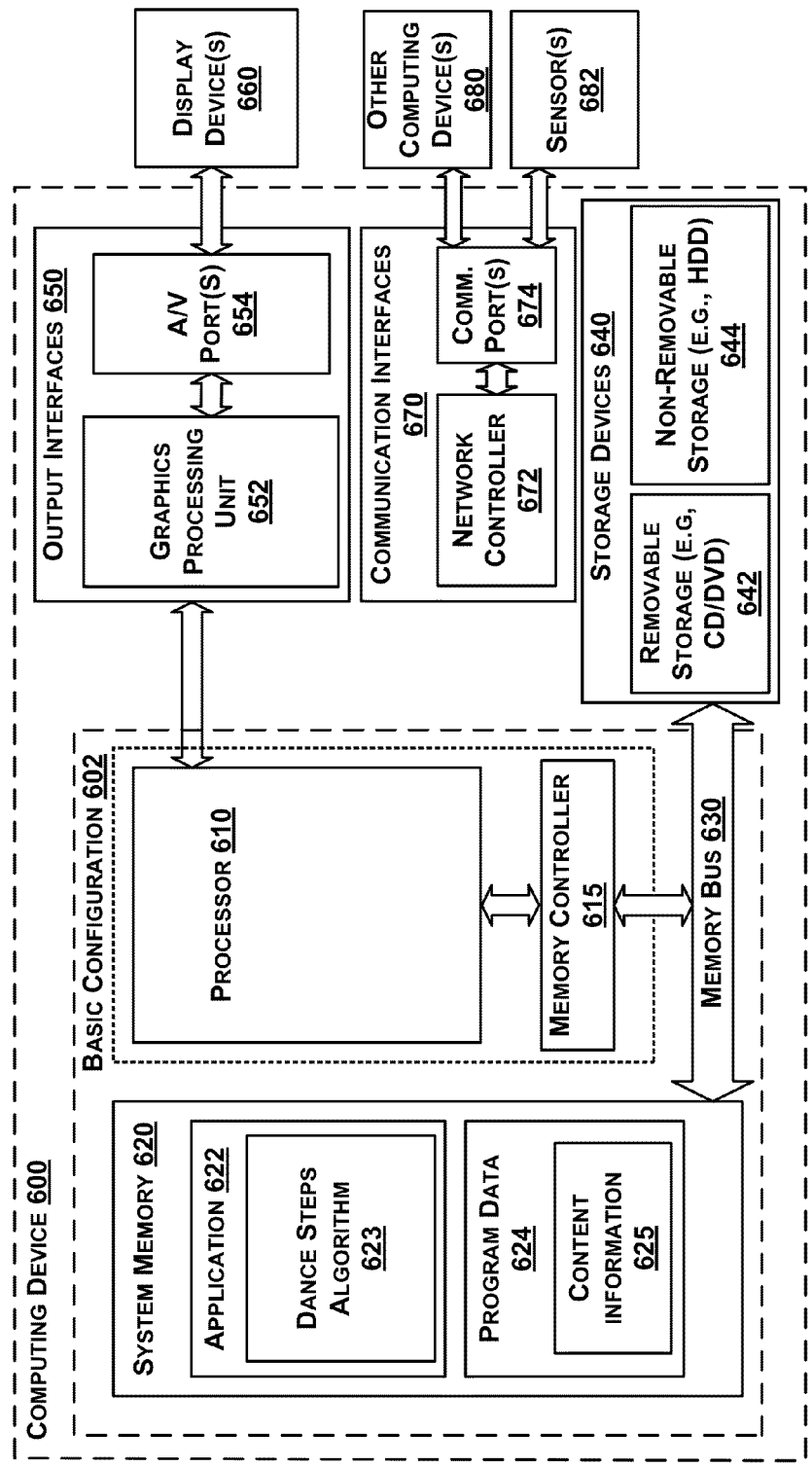
FIG. 6 is a functional block diagram illustrating an example computing device used in a computing system that is arranged in accordance with at least some embodiments described herein.

FIG. 6 is a functional block diagram illustrating an example computing device 600 used in a computing system that is arranged in accordance with at least some embodiments described herein. The computing device may be a personal computer, mobile device, cellular phone, video game system, or global positioning system, and may be implemented as a client device, a server, a system, a combination thereof, or as a portion of components described in FIGS. 1, 2, and 4. In a basic configuration 602, computing device 600 may include one or more processors 610 and system memory 620. A memory bus 630 can be used for communicating between the processor 610 and the system memory 620. Depending on the desired configuration, processor 610 can be of any type including but not limited to a microprocessor (μP), a microcontroller (μC), a digital signal processor (DSP), or any combination thereof. A memory controller 615 can also be used with the processor 610, or in some implementations, the memory controller 615 can be an internal part of the processor 610.

Depending on the desired configuration, the system memory 620 can be of any type including but not limited to volatile memory (such as RAM), non-volatile memory (such as ROM, flash memory, etc.) or any combination thereof. System memory 620 may include one or more applications 622, and program data 624. Application 622 may include dance steps algorithm 623 that is arranged to provide inputs to the electronic circuits, in accordance with the present disclosure. Program Data 624 may include content information 625 that could be directed to any number of types of data. In some example embodiments, application 622 can be arranged to operate with program data 624 on an operating system.

Computing device 600 can have additional features or functionality, and additional interfaces to facilitate communications between the basic configuration 602 and any devices and interfaces. For example, data storage devices 640 can be provided including removable storage devices 642, non-removable storage devices 644, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 620 and storage devices 640 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of device 600.

Computing device 600 can also include output interfaces 650 that may include a graphics processing unit 652, which can be configured to communicate to various external devices such as display devices 660 or speakers via one or more A/V ports 654 or a communication interface 670. The communication interface 670 may include a network controller 672, which can be arranged to facilitate communications with one or more other computing devices 680 and one or more sensors 682 over a network communication via one or more communication ports 674. The one or more sensors 682 are shown external to the computing device 600, but may also be internal to the device. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 600 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 can also be implemented as a personal computer including both laptop computer and non-laptop computer configurations.

Figure 7:
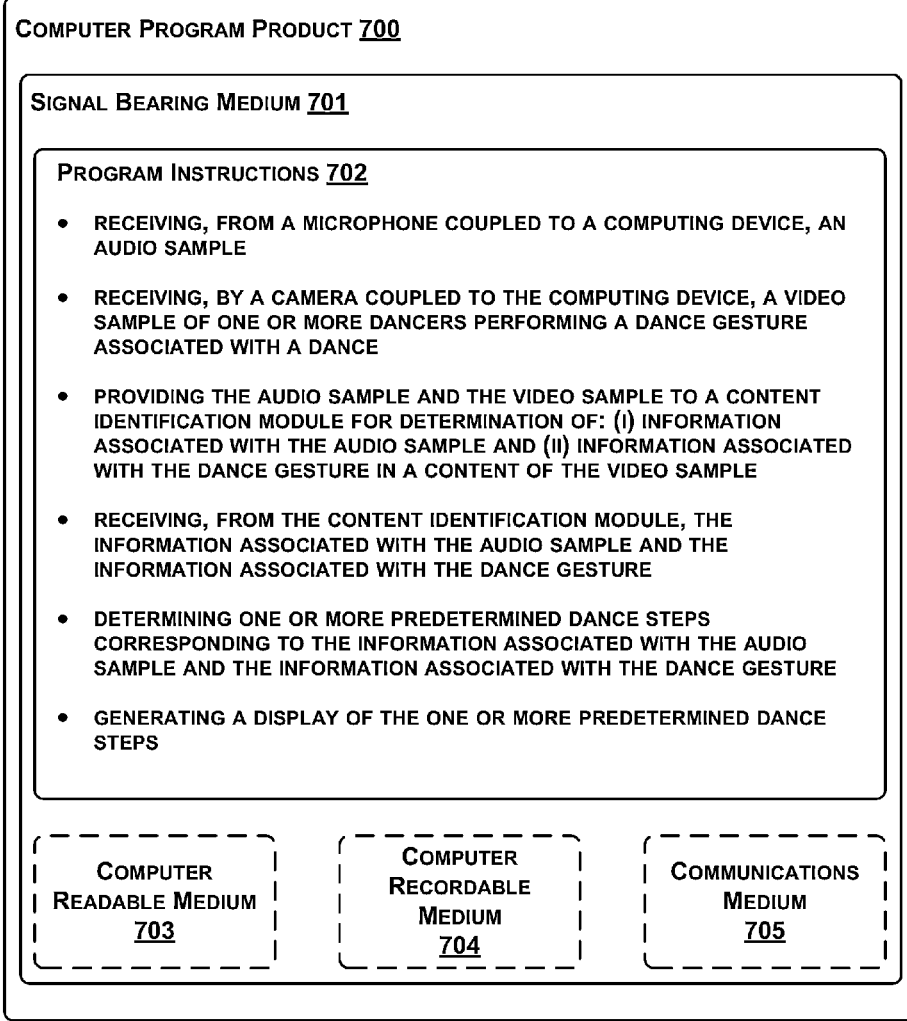
FIG. 7 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a computer-readable storage media in a machine-readable format, or on other non-transitory media or articles of manufacture. FIG. 7 is a schematic illustrating a conceptual partial view of an example computer program product 700 that includes a computer program for executing a computer process on a computing device, arranged according to at least some embodiments presented herein. In one embodiment, the example computer program product 700 is provided using a signal bearing medium 701. The signal bearing medium 701 may include one or more program instructions 702 that, when executed by one or more processors may provide functionality or portions of the functionality described above with respect to FIGS. 1-6. Thus, for example, referring to the embodiments shown in FIGS. 4 and 5, one or more features of blocks 402-408 and/or blocks 502-506 may be undertaken by one or more instructions associated with the signal bearing medium 701. In addition, the program instructions 702 in FIG. 7 describe example instructions as well.

In some examples, the signal bearing medium 701 may encompass a computer-readable medium 703, such as, but not limited to, a hard disk drive, a Compact Disc (CD), a Digital Video Disk (DVD), a digital tape, memory, etc. In some implementations, the signal bearing medium 701 may encompass a computer recordable medium 704, such as, but not limited to, memory, read/write (R/W) CDs, R/W DVDs, etc. In some implementations, the signal bearing medium 701 may encompass a communications medium 705, such as, but not limited to, a digital and/or an analog communication medium (e.g., a fiber optic cable, a waveguide, a wired communications link, a wireless communication link, etc.). Thus, for example, the signal bearing medium 701 may be conveyed by a wireless form of the communications medium 705 (e.g., a wireless communications medium conforming to the IEEE 802.11 standard or other transmission protocol).

The one or more programming instructions 702 may be, for example, computer executable and/or logic implemented instructions. In some examples, a computing device such as the computing device 600 of FIG. 6 may be configured to provide various operations, functions, or actions in response to the programming instructions 702 conveyed to the computing device 600 by one or more of the computer readable medium 703, the computer recordable medium 704, and/or the communications medium 705. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving, from a microphone coupled to a computing device, an audio sample;
receiving, by a camera coupled to the computing device, a video sample of one or more dancers performing a dance gesture associated with a dance;
providing the audio sample and the video sample to a content identification module for determination of: (i) information associated with the audio sample and (ii) information associated with the dance gesture in a content of the video sample;
receiving, from the content identification module, the information associated with the audio sample and the information associated with the dance gesture;
determining one or more predetermined dance steps corresponding to the information associated with the audio sample and the information associated with the dance gesture; and
generating a display of the one or more predetermined dance steps.

2. The method of claim 1, wherein the computing device includes a wearable computing device.

3. The method of claim 2, further comprising causing a head-mounted display (HMD) coupled to the wearable computing device to display the one or more predetermined dance steps.

4. The method of claim 1, wherein generating the display of the one or more predetermined dance steps comprises generating a display of an animation of the one or more predetermined dance steps.

5. The method of claim 1, wherein receiving, from the content identification module, the information associated with the audio sample comprises receiving at least one of: (i) an identification of the song and (ii) information indicating a genre of the song.

6. The method of claim 1, wherein receiving, from the content identification module, the information associated with the dance gesture comprises receiving at least one of: (i) an identification of the dance and (ii) information indicating a genre of the dance.

7. The method of claim 1, further comprising:
receiving the audio sample and the video sample from an ambient environment;
receiving information associated with the ambient environment including one or more of (i) a geographic location and (ii) a time;
receiving information associated with a demographic of the one or more dancers in the ambient environment including one or more of: (i) a number of the one or more dancers, (ii) an average age of the one or more dancers, and (iii) a gender of the one or more dancers; and
determining the one or more predetermined dance steps corresponding to one or more of the information associated with the ambient environment, the information associated with the demographic of the dancers, the information associated with the audio sample, and the information associated with the dance gesture.

8. The method of claim 1, further comprising:
receiving information associated with a performance of the one or more predetermined dance steps;
comparing the performance of the one or more predetermined dance steps to the one or more predetermined dance steps; and
providing a score indicative of a degree to which the performance of the one or more predetermined dance steps matches the one or more predetermined dance steps.

9. A computer readable memory having stored thereon instructions executable by a computing device to cause the computing device to perform functions comprising:
receiving, by a microphone coupled to the computing device, an audio sample;
receiving, by a camera coupled to the computing device, a video sample of one or more dancers performing a dance gesture associated with a dance;
providing the audio sample and the video sample to a content identification module for determination of: (i) information associated with the audio sample and (ii) information associated with the dance gesture in a content of the video sample;
receiving, from the content identification module, the information associated with the audio sample and the information associated with the dance gesture;
receiving one or more predetermined dance steps corresponding to the information associated with the audio sample and the information associated with the dance gesture; and
generating a display of the one or more predetermined dance steps.

10. The computer readable memory of claim 9, wherein the computing device includes a wearable computing device.

11. The computer readable memory of claim 10, wherein the instructions are further executable by the wearable computing device to cause the wearable computing device to perform functions comprising causing a head-mounted display (HMD) coupled to the wearable computing device to display the one or more predetermined dance steps.

12. The computer readable memory of claim 9, wherein the function of receiving, from the content identification module, the information associated with the audio sample comprises receiving information associated with at least one of (i) an identification of the song and (ii) information indicating a genre of the song.

13. The computer readable memory of claim 9, wherein the function of receiving, from the content identification module, the information associated with the dance gesture comprises receiving information associated with at least one of (i) an identification of the dance associated with the dancing and (ii) information indicating a genre of the dance.

14. The computer readable memory of claim 9, wherein the instructions are further executable by the computing device to cause the computing device to perform functions comprising:
receiving information associated with a dancer performing the one or more predetermined dance steps including one or more of (i) an age and (ii) a gender of the dancer; and
determining the one or more predetermined dance steps corresponding to one or more of the information associated with the dancer, the information associated with the audio sample, and the information associated with the dance gesture.

15. A system comprising:
a wearable computing device including a head-mounted display (HMD);
a camera coupled to the wearable computing device;
a microphone coupled to the wearable computing device; and
a processor in communication with the wearable computing device, the camera, and the microphone, wherein the processor is configured to:
receive, from the microphone, an audio sample;
receive, from the camera, a video sample of one or more dancers performing a dance gesture associated with a dance;
provide one or more of the audio sample and the video sample to a content identification module for determination of information associated with one or more of: (i) the audio sample and (ii) the dance gesture in a content of the video sample;
receive, from the content identification module, the information associated with one or more of the audio sample and the dance gesture;
determine one or more predetermined dance steps corresponding to the information associated with one or more of the audio sample and the dance gesture; and
generate a display of the one or more predetermined dance steps on the HMD.

16. The system of claim 15, wherein the processor is further configured to generate an animation of the one or more predetermined dance steps on the HMD.

17. The system of claim 15, wherein the processor is further configured to:
receive information associated with a performance of the one or more predetermined dance steps;
compare the performance of the one or more predetermined dance steps to the one or more predetermined dance steps; and
provide an indication of a degree to which the performance of one or more predetermined dance steps matches the one or more predetermined dance steps.

18. The system of claim 17, further comprising one or more wearable sensors coupled to the wearable computing device, and wherein the processor is configured to receive the information associated with the performance of the one or more predetermined dance steps from the one or more wearable sensors.

19. The system of claim 17, wherein the wearable computing device is a first wearable computing device, wherein the camera is a first camera, and wherein the processor is further configured to:
receive a camera feed associated with performing the one or more predetermined dance steps from a second camera coupled to a second wearable computing device; and
evaluate, from the camera feed, the performance of the one or more predetermined dance steps.

20. The system of claim 17, wherein the processor is further configured to generate a display of a first dancing pattern associated with performing the one or more predetermined dance steps and a display of a second dancing pattern associated with the one or more predetermined dance steps to provide the indication of the degree to which the performance of the one or more predetermined dance steps matches the one or more predetermined dance steps.

* * * * *